(12) United States Patent
Cho (10) Patent No.: US 11,325,081 B2
(45) Date of Patent: May 10, 2022

(54) APPARATUS FOR MANUFACTURING WATER HAVING HIGH CONCENTRATION OF DISSOLVED OZONE

(71) Applicant: GDT CO., LTD., Hwaseong-si (KR)

(72) Inventor: Ki Won Cho, Gyeonggi-do (KR)

(73) Assignee: GDT CO., LTD., Gyeonggi-do (KR)

( * ) Notice: Subject to any disclaimer, the term of this patent is extended or adjusted under 35 U.S.C. 154(b) by 292 days.

(21) Appl. No.: 16/347,355

(22) PCT Filed: Oct. 31, 2017

(86) PCT No.: PCT/KR2017/012183
§ 371 (c)(1),
(2) Date: May 3, 2019

(87) PCT Pub. No.: WO2018/084542
PCT Pub. Date: May 11, 2018

(65) Prior Publication Data
US 2019/0381466 A1    Dec. 19, 2019

(30) Foreign Application Priority Data
Nov. 7, 2016   (KR) .................. 10-2016-0147466

(51) Int. Cl.
*C02F 1/78*       (2006.01)
*B01F 25/312*    (2022.01)
*B01F 23/237*    (2022.01)

(52) U.S. Cl.
CPC .............. *B01F 25/312* (2022.01); *C02F 1/78* (2013.01); *B01F 23/237613* (2022.01); *C02F 2201/782* (2013.01); *C02F 2201/784* (2013.01); *C02F 2303/04* (2013.01)

(58) Field of Classification Search
CPC .................................. B01F 5/04; C02F 1/78
See application file for complete search history.

(56) References Cited

U.S. PATENT DOCUMENTS 9,938,994 B2   4/2018   Lee

FOREIGN PATENT DOCUMENTS

| JP | 2011-230063 A | 11/2011 |
|----|---|---|
| KR | 20-0192932 Y1 | 8/2000 |
| KR | 10-0552978 B1 | 2/2006 |
| KR | 100552978 B1 * | 2/2006 |
| KR | 10-1030061 B1 | 4/2011 |

(Continued)

OTHER PUBLICATIONS

International Search Report Corresponding to PCT/KR2017/012183 dated Feb. 8, 2018.

(Continued)

*Primary Examiner* — Walter D. Griffin
*Assistant Examiner* — Cameron J Allen
(74) *Attorney, Agent, or Firm* — Finch & Maloney PLLC; Michael J. Bujold; Jay S. Franklin (57) ABSTRACT

An apparatus for manufacturing water having a high concentration of dissolved ozone is characterized by being configured by connecting: a filtering device; a water tank connected to the filtering device; a pump connected to the water tank; a Venturi tube connected to the pump; a first gas dissolving pressure device connected to the Venturi tube; and a second gas dissolving pressure device connected to the first gas dissolving pressure device.

4 Claims, 8 Drawing Sheets

(56) References Cited

FOREIGN PATENT DOCUMENTS

| KR | 10-2012-0021970 | A | | 3/2012 |
|----|----|----|----|----|
| KR | 20120021970 | A | * | 3/2012 |
| KR | 10-1269866 | B1 | | 6/2013 |
| KR | 10-2015-0118891 | A | | 10/2015 |

OTHER PUBLICATIONS

Written Opinion Corresponding to PCT/KR2017/012183 dated Feb. 8, 2018.

* cited by examiner

APPARATUS FOR MANUFACTURING WATER HAVING HIGH CONCENTRATION OF DISSOLVED OZONE

TECHNICAL FIELD

The present invention relates to an apparatus for manufacturing high-concentration ozone-dissolved water (or apparatus for manufacturing water having a high concentration of dissolved ozone) by applying pressure continuously to water to allow the water to pass through a plurality of perforated meshes.

BACKGROUND ART

In general, chlorine may be introduced to provide sterilizing power in water, or an ozone gas is injected into water to perform sterilization. In particular, in the case of using the ozone gas, a large amount of ozone gas may be injected into water to make it high-concentration ozone-dissolved water having powerful sterilizing power.

However, chlorine introduced into a raw water container leaves a component called trihalomethane in the water, which may cause secondary contamination or cancer.

Also, an ozone generating device for generating the ozone gas is expensive, and if a large amount of ozone gas is introduced to increase dissolution efficiency of the ozone gas, economic cost and damage to exhaust ozone may also be serious.

In particular, in Patent Nos. 10-1030061 and 10-1269866 (inventor: CHO KI-won, title: Apparatus for Generating OH-radical and manufacturing method using the same) acquired by the inventor of the present application, in order to prepare high-concentration ozone-dissolved water, which is a stage that occurs before producing OH radical water, water is decomposed to individual water molecules using a water decomposing device (i.e., water splitter) and mixed water and ozone gas are dissolved using a separate pressure device.

However, a cost therefor, a cost of the consumables of metal active carbon for treating an undissolved ozone gas, and equipment specifications and a scale of facility are increased, thereby causing an increase in an economic burden.

Therefore, a gas dissolving pressure device that combines functions of the water decomposing device and a pressure device into one function and a gas dissolving pressure device that drastically removes exhaust ozone have been developed.

DISCLOSURE

Technical Problem

In the related art, manufacturing ozone-dissolved water having a high concentration of 3.0 ppm or higher consumes large energy and requires a large size of facility, and thus, a risk of exhaust ozone and personnel expenses due to an increased working time, as well as the cost for facility, are too high to satisfy the effect of high efficiency and low cost.

Accordingly, an aspect of the present invention is to provide an apparatus for manufacturing high-concentration ozone-dissolved water, which remarkably reduces exhaust ozone with high efficiency and low cost and drastically reduces operational management cost.

Technical Solution

In order to solve the above problems, the present invention has the following configuration.

a filtering device;
a water tank connected to the filtering device;
a pump connected to the water tank;
a venturi tube connected to the pump; and
a gas dissolving pressure device connected to the venturi tube.

In addition, the gas dissolving pressure device is provided in plurality and a first gas dissolving pressure device and a second gas dissolving pressure device are connected to each other.

Here, ozone separated from water is connected to the venturi tube through a returning pipe.

In addition, the first gas dissolving pressure device includes:
a liquid inlet 151 configured on one side to allow a liquid to be injected therethrough on one side; and
a clogging plate configured on the other side and closed not to allow the liquid to pass therethrough;
wherein the clogging plate and the liquid inlet include: a cylindrical first pipe 153 formed as a pipe;
a plurality of holes configured around the cylindrical first pipe;
a cylindrical second pipe 154 configured to surround the cylindrical first pipe;
a third cylindrical pipe 155 configured to surround the cylindrical second pipe; and
a plurality of holes configured around the cylindrical second pipe.

Here, the plurality of holes are configured such that a diameter of an outlet side of the liquid is smaller than a diameter of an inlet side of the liquid.

In addition, the second gas dissolving pressure device solves the problem by arranging a plurality of thin film separation plates.

It is effective to be divided into four groups.

Preferably, the plurality of thin film separation plates are arranged so that holes are disposed to stagger.

More preferably, the plurality of thin film separation plates may be divided into a plurality of groups to increase an effect.

Here, an exhaust ozone destruction heater for destroying exhaust ozone separated from the water tank to treat an exhaust ozone, which may be emitted, is provided.

Advantageous Effects

As an apparatus for manufacturing ozone-dissolved water having a concentration of 3.0 ppm or greater without an exhaust ozone, the apparatus may make existing inefficient apparatus of high cost and low efficiency be an apparatus of low cost and high efficiency.

Also, there is no burden on the consumables of an active carbon type for reducing exhaust ozone that occurs while an ozone-dissolved water having a high concentration of 3.0 ppm or higher is in use, and there is no facility burden due to the scale of the apparatus.

It is economically effective to improve performance of quality improvement by shortening a working time.

Therefore, the present invention satisfies all of the above-mentioned requirements and ensures safety.

BEST MODES

Figure 8:
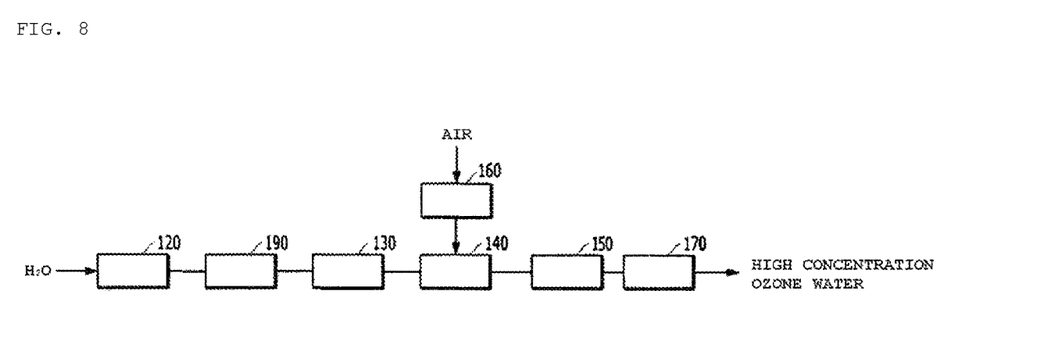
FIG. 8 is a general view of an apparatus.

Referring to FIG. 8, description will be made below.

Water passing through a filtering device 120 is introduced into a water tank 190 and the water is rapidly moved to a venturi tube 140 by a pump 130 so that an ozone gas generated by an ozone generating device 160 and through a nozzle 145 is mixed with the water in the venturi tube 140.

A high-concentration ozone water is produced through a second gas dissolving pressure device 170 by passing through a first gas dissolving pressure device 150 from the venturi tube 140.

An exhaust ozone destruction heater 250 is a safety device which is connected to an air hole 210 of the water tank 190 to destroy a small amount of undissolved exhaust ozone in the water tank 190 to maintain 0.06 ppm or below which is an allowable reference value for emitting an ozone gas in the air.

MODE FOR INVENTION

Hereinafter, an embodiment of the present invention will be described with reference to the accompanying drawings.

Figure 1:
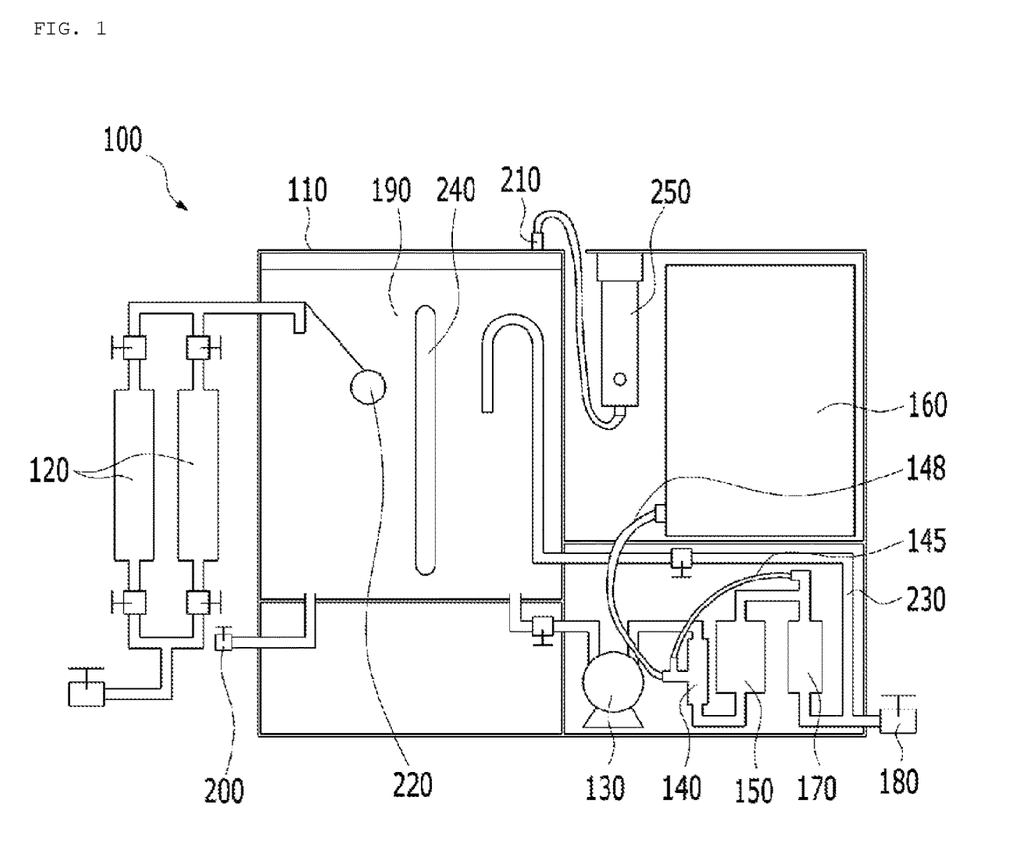
FIG. 1 is a view illustrating an apparatus for manufacturing a high-concentration ozone-dissolved water according to an embodiment of the present invention.

FIG. 1 is a view of an apparatus for manufacturing a high-concentration ozone-dissolved water without an exhaust ozone according to an embodiment of the present invention.

The apparatus 100 according to an embodiment of the present invention includes a main body case 110, first and second filtering devices 120, a pump 130, a venturi tube 140, a first gas dissolving pressure device 150, an ozone generating device 160, a second gas dissolving pressure device 170, a valve 180, a water tank 190, a drain valve 200, an air hole 210, a ball top 220, a return pipe 230, a transparent window 240, and an exhaust ozone destruction heater 250.

The main body case 110, the water tank 190, the filtering device 120, the pump 130, the venturi 140, the first gas dissolving pressure device 150, the second gas dissolving pressure device 170, the valve 180, the drain valve 200, and the ball top 220 are formed of materials that may withstand an ozone gas component.

The filtering device 120 is connected to an inlet of a water supply pipe and the valve 180 is connected to an end of an outlet pipe.

The filtering device 120 prevents foreign matter from entering the water tank 190 and allows filters inside the filtering device 120 to be cleaned by being opened/closed. The filtering device 120 may be additionally installed dually or triply for continuity of equipment operation.

An air hole 210 is formed at an upper portion of the water tank 190 and the exhaust ozone destruction heater 250 is connected thereto, and the ball top 220 is installed to be connected to the filtering device 120 in the water tank 190.

The transparent window 240 is provided on a front surface of the water tank 190 so that the inside of the water tank may be seen from the outside.

The drain valve 200 is connected to the bottom to remove residues in the water tank.

Water passing through the 1 kw or 0.75 kw pump 130 for 220 V connected to the water tank 190 passes through the venturi tube 140 connected to the pump 130.

Using the venturi tube 140, the ozone generating device 160 mixes 5 g/hr of ozone gas formed from 4.0 L/min of oxygen extracted from the air into the water.

The water and ozone gas mixed through the venturi tube 140 passes through the first gas dissolving pressure device 150 connected to the venturi tube 140.

Preferably, pressure in the pipe of the pump 130 at this time is 1.0-4.0 kg/m$^3$.

The liquid gas mixture of water and ozone gas passes through the second gas dissolving pressure device 170 connected to the first gas dissolving pressure device 150 so that the ozone gas, which has not been dissolved by the first gas dissolving pressure device in the water, is again pressed so that ozone is dissolved.

For the ozone gas which has not been dissolved yet, a pipe 145 for the gas to be returned to the venturi tube 140 is formed and an ozone-dissolved water having a high concentration of 3.0 ppm or higher without an exhaust ozone is discharged through the valve 180 connected to the second gas dissolving pressure device 170.

This will be described with reference to FIG. 2.

Figure 2:
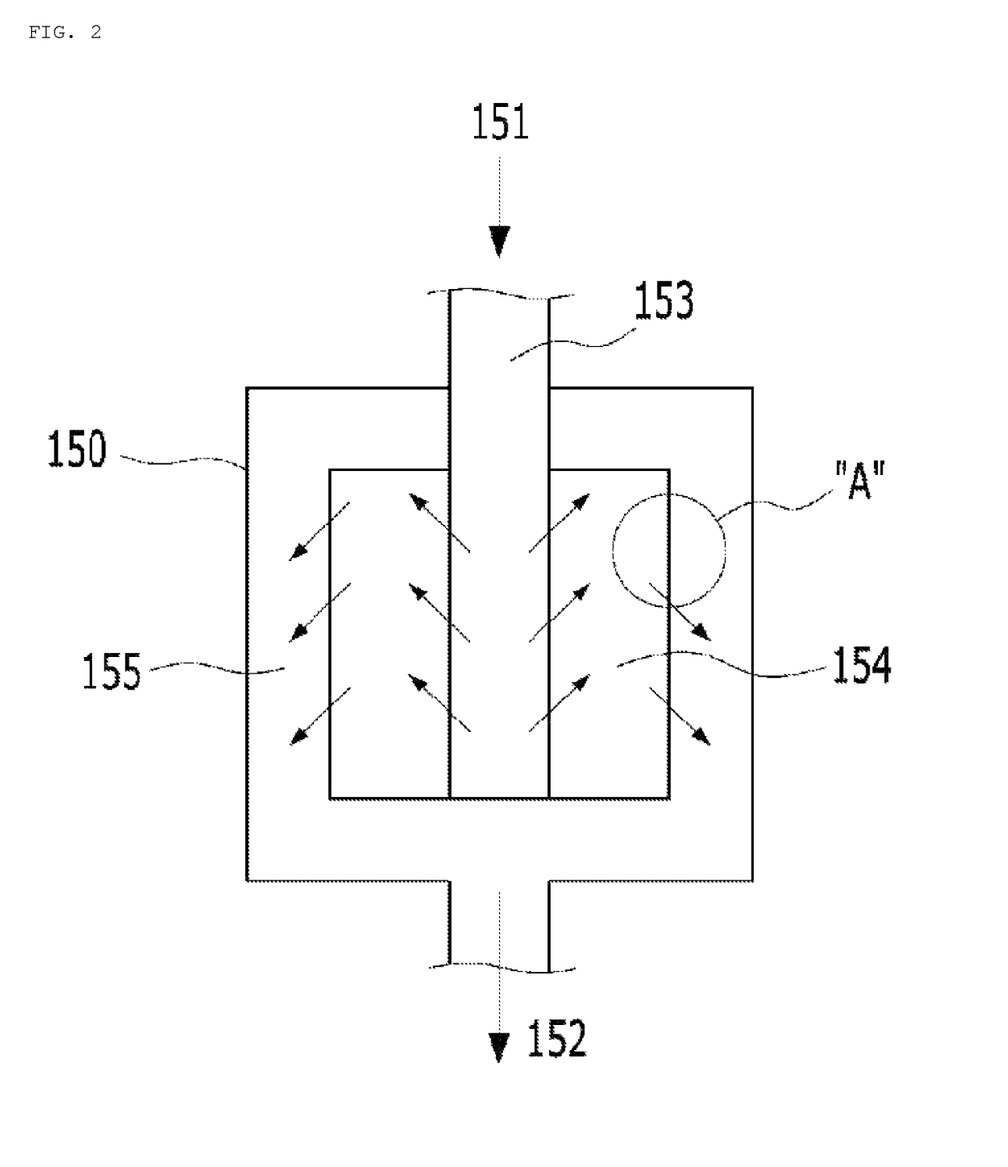
FIG. 2 is a view relating to a first gas dissolving pressure device.
Figure 3:
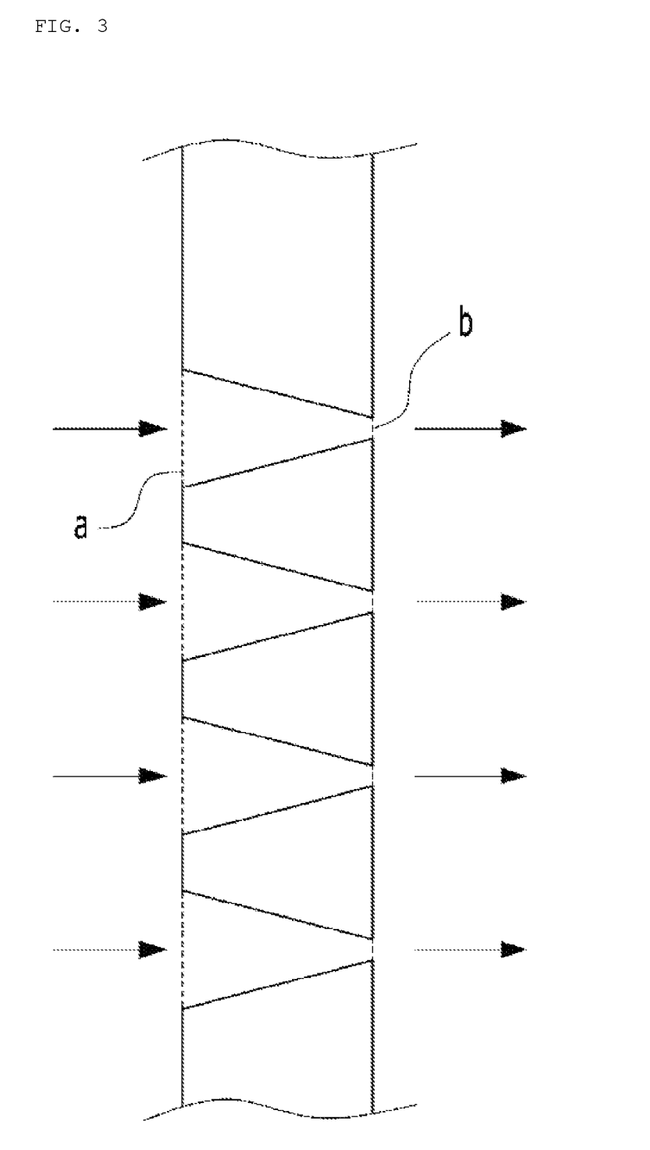
FIG. 3 is a view illustrating "A" which shows a pipe surface in a longitudinal direction in which a cross section of a hole of FIG. 2 is formed with a plurality of holes having a conical shape.
Figure 4:
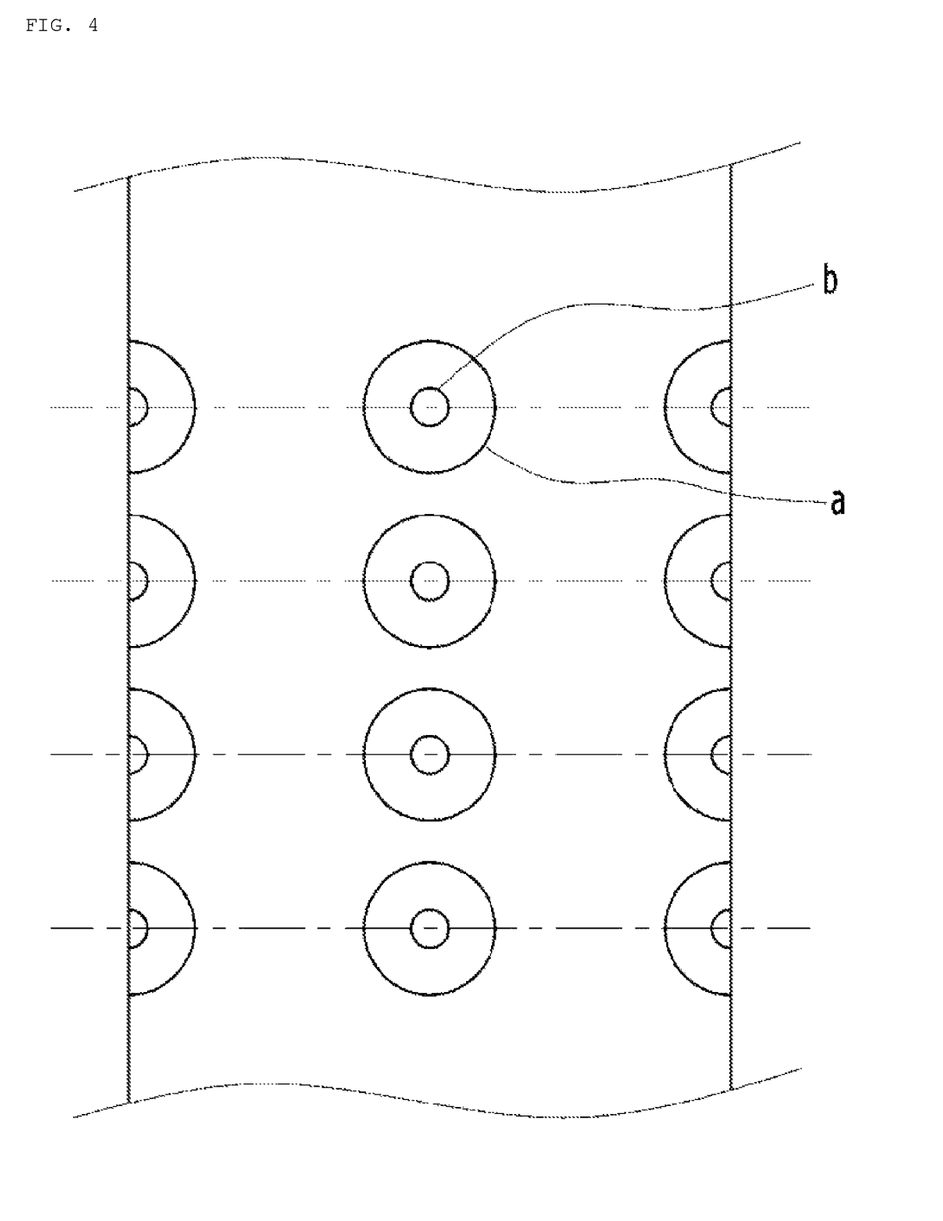
FIG. 4 is a view illustrating an inner surface by cutting a pipe in a longitudinal direction.

The first gas dissolving pressure device 150 is the same as shown in FIGS. 2 to 4.

FIG. 2 is a view of the first gas dissolving pressure device. For water passing through an inlet portion 151 of the first gas dissolving pressure device to flow to the second gas dissolving pressure device 170, the water must move in the direction of the arrows.

FIG. 2 is a view illustrating a configuration of the first gas dissolving pressure device.

In the nano bubble device including the liquid inlet 151 and a liquid outlet 152, the first gas dissolving pressure device includes:

a liquid inlet 151 configured on one side to allow a liquid to be injected therethrough on one side; and a clogging plate configured on the other side and closed not to allow a liquid to pass therethrough in a linear direction;

wherein the clogging plate and the liquid inlet include: a cylindrical first pipe 153 formed as a pipe;

a plurality of holes formed around the cylindrical first pipe;

a cylindrical second pipe 154 surrounding the cylindrical first pipe;

a third cylindrical pipe 155 surrounding the cylindrical second pipe; and a plurality of holes formed around the cylindrical second pipe.

Here, the cylindrical third pipe is configured to communicate with the nano bubble liquid outlet 152.

The clogging plate may be configured at a time when the cylindrical second tube is configured.

FIG. 3 is a view illustrating a thickness surface of inner and outer pipes 153 and 154.

As seen in a direction from the inside to the outside, the plurality of holes are configured such that a diameter b of the outlet side of a liquid is smaller than a diameter a of the inlet side of the liquid.

When water passes through the holes which are gradually narrowed in a taper form from the diameter of the inlet side to the diameter of the outlet side, water particles are broken down to form nanobubbles.

In this configuration, nanobubbles are created at a low cost and with a simple configuration.

FIG. 4 shows the inside of the pipe 153 taken in half in a longitudinal direction. The inside of the hole corresponds to a large hole a and the outside of the hole corresponds to a small hole b.

That is, the pipe is manufactured to have a plurality of holes perforated with a conical cross-section.

The first gas dissolving pressure device may be configured as a plurality of devices in series to obtain an increased effect.

This will be described with reference to FIGS. 5, 6, and 7.

Figure 5:
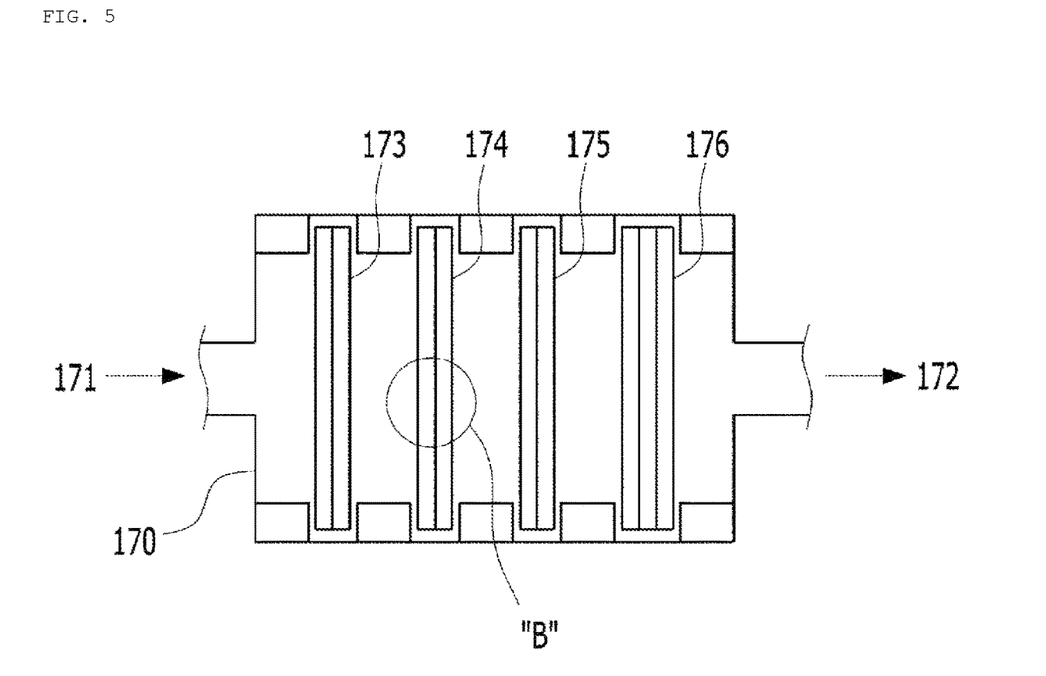
FIG. 5 is a view illustrating a configuration of a second gas dissolving pressure device.

FIG. 5 is a schematic view of a second gas dissolving pressure device. Thin film separation plates including a plurality of holes are illustrated. In FIG. 5, a plurality of thin film separation plates include three groups 173, 174, and 175 of pairs of thin film separation plates and one group 176 to form the second gas dissolving pressure device 170.

According to an experiment, it is economically most effective to divide the thin film separation plates into four groups.

A pressure is reduced by a magnitude of 0.1 kg/cm² when water passes through one group.

The second gas dissolving pressure device 170 includes an inlet 171 through which a liquid enters and an outlet 172.

As the number of the thin film separation plates increases, a stronger effect is obtained.

In the fourth group, it is more effective to provide five or more thin film separation plates.

Figure 6:
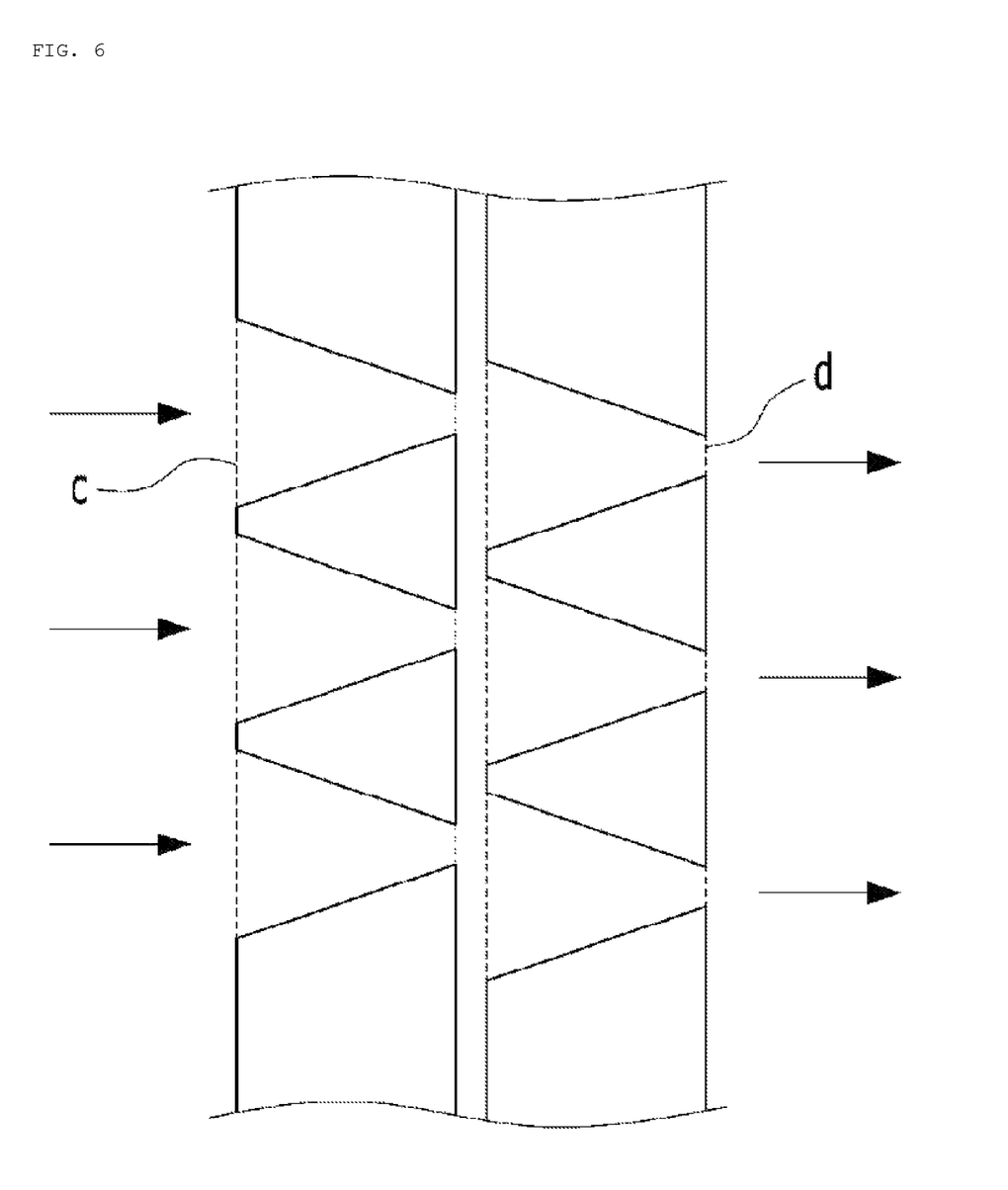
FIG. 6 is a view illustrating a cut plane of "B".

FIG. 6 is a cross-sectional view of a portion "B". This figure shows that a number of wedge-shaped holes are formed. It is shown that holes are formed such that a liquid flows to the plurality of separation plates of the second group, and it can be seen that an inlet c into which the liquid enters has a wide interval and the outlet d from which the liquid exits has a narrow interval.

Further, the separation plates slightly stagger each other so that when the liquid flows, the liquid bumps into each other when it passes through the separation plate to further form bubbles.

Figure 7:
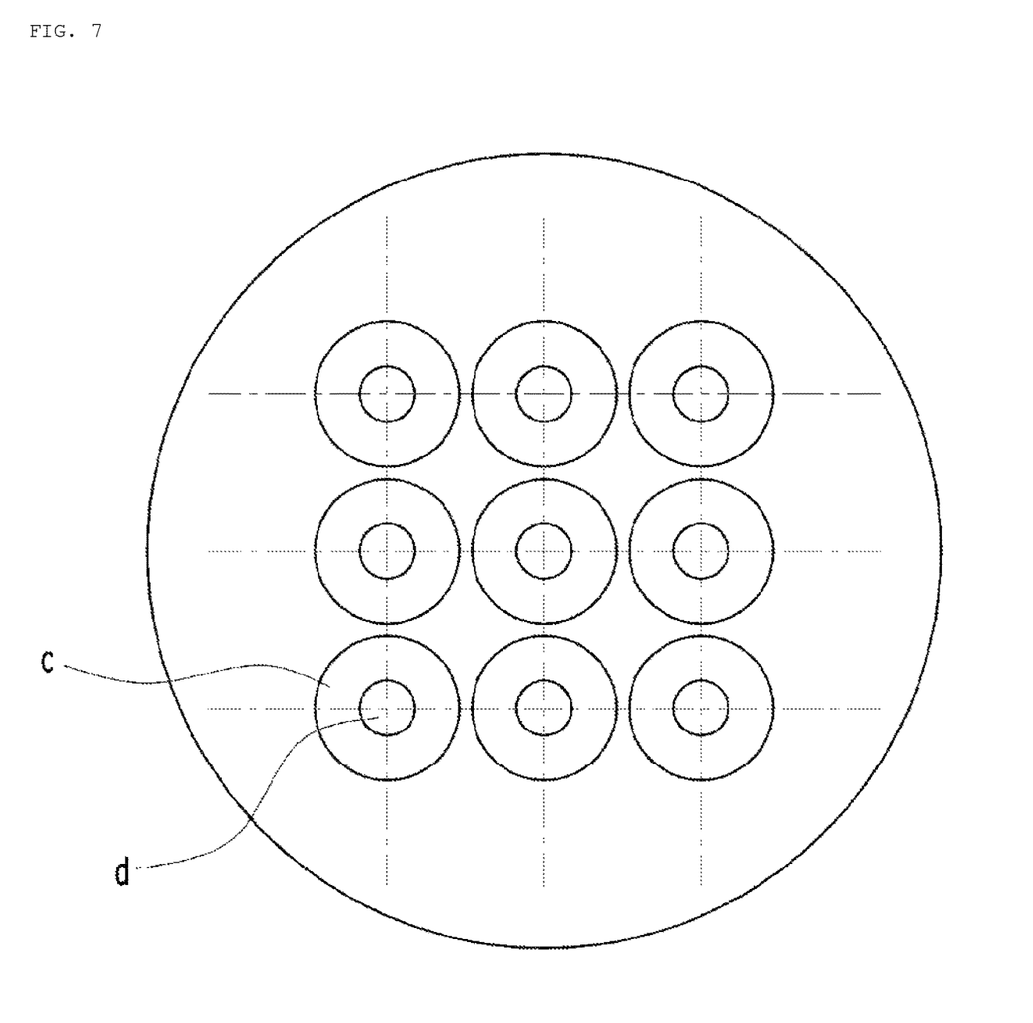
FIG. 7 is a view illustrating a flow direction of a liquid inside a separation plate.

FIG. 7 is a view in a direction from the inlet to the outlet in the inside. It is seen that holes are formed in a wedge type. Although it is seen that the holes are formed uniformly, the holes need not be uniform.

That is, the first gas dissolving pressure device shown in FIGS. 2 to 4 may be provided at 170. It is also possible to alternately provide the second gas dissolving pressure device shown in FIGS. 5 to 7 at 150.

Further, the second gas dissolving pressure device may be configured at both 150 and 170.

Similarly, the first gas dissolving pressure device may be configured at both 150 and 170.

Accordingly, the scope of rights protection is also described in the claims.

The second gas dissolving pressure device 170 has a cone-shaped cross section with a diameter of 1 mm or less as shown in FIG. 7.

A plurality of perforated meshes are formed to overlap at a predetermined interval, and the valve 180 adjusts the amount of ozone-dissolved water having high a concentration of 3.0 ppm or greater to be within 1 ton to 0.3 ton per hour to supply the same.

The return pipe 230 is installed to allow the ozone-dissolved water to circulate in order to protect the pump 130 and not to hurt the apparatus when the ozone-dissolved water is not used.

Referring to FIG. 8, descriptions will be made below.

The water passing through the filtering device 120 is supplied to the water tank 190 and the water is rapidly moved to the venturi tube 140 by the pump 130 so that the ozone gas generated by the ozone generating device 160 is mixed with the water in the venturi tube 140 through the nozzle 145.

In the venturi tube 140, ozone water having a high concentration is produced through the first gas dissolving pressure device 150 and the second gas dissolving pressure device 170.

The exhaust ozone destruction heater 250, as a safety device, is installed to be connected to the air hole 210 of the water tank 190 to destroy a small amount of undissolved exhaust ozone in the water tank 190 to maintain 0.06 ppm or below which is an allowable reference value for emitting an ozone gas in the air.

The apparatus for manufacturing high-concentration ozone-dissolved water according to an embodiment of the present invention is a combination of the function of a water decomposition apparatus which was filed by the inventor of this application and the function of the pressure pipe for pressing water mixed with the ozone gas.

When the water mixed with the ozone gas in the pipe passes through the first gas dissolving pressure device 150, the water mixed with the ozone gas is decomposed into individual water molecules and simultaneously spread and increase the pressure in the water to maintain the dissolved ozone gas in the water.

In addition, as a method for substituting the function of the metal active carbon, which is a consumable installed to prevent discharge of an exhaust ozone, the water passes through the second gas dissolving pressure device 170 so that the ozone gas in the water is separated and returned again to the venturi 140 so as to be mixed.

At the same time, the present invention is an apparatus for continuously and repeatedly applying pressure of a liquid or gas passing through the inside of the apparatus to produce and discharge the ozone-dissolved water having a high concentration of 3.0 ppm or higher without an exhaust ozone by the power of the pump.

It should be appreciated that terms or words used in the specification and claims should not be limited and construed as common or dictionary meanings, and should be construed as meanings and concepts according to the technical spirit of the present invention based on the principle that the inventor can appropriately define the concept of each term for describing the present invention in the best way.

While the present invention has been particularly shown and described with reference to embodiments thereof, it should be understood by those skilled in the art that various changes and modifications may be made without departing from the spirit and scope of the invention as defined by the appended claims.

INDUSTRIAL APPLICABILITY

The present invention intends to configure an apparatus for manufacturing high-concentration ozone-dissolved water, which remarkably reduces exhaust ozone with high efficiency and low cost and drastically reduces operational management cost.

In addition, there is no burden on the consumables of an active carbon type for reducing exhaust ozone that occurs while an ozone-dissolved water having a high concentration of 3.0 ppm or higher is in use, there is no facility burden due to the scale of the apparatus, it is economically effective to improve performance of quality improvement by shortening a working time, and safety is ensured.

The invention claimed is:

1. An apparatus for manufacturing high-concentration ozone-dissolved water, the apparatus comprising:
    a filtering device;
    a water tank connected to the filtering device;
    a pump connected to the water tank;
    a venturi tube connected to the pump;
    an ozone generating device connected to the venturi tube; and
    a gas dissolving pressure device connected to the venturi tube,
    wherein the gas dissolving pressure device includes a first gas dissolving pressure device and a second gas dissolving pressure device connected to each other,
    liquid and ozone are mixed in the venturi tube and subsequently connected to the first gas dissolving pressure device so that the ozone is well dissolved in the liquid, and exhaust ozone generated by the mixed liquid passing through the first gas dissolving pressure device is connected to the venturi tube;
    the second gas dissolving pressure device includes:
    a liquid inlet configured, on one side, to allow the liquid to be injected therethrough;
    a liquid outlet configured, on the other side, to allow the liquid to pass therethrough; and
    a separation plate including a plurality of holes between the one side of the second gas dissolving pressure device and the other side of the second gas dissolving pressure device;
    wherein the holes provided in the separation plate are configured such that a diameter of the hole adjacent to the liquid inlet is smaller than a diameter of the hole adjacent to an outlet side of the liquid,
    the separation plate is provided as a plurality of thin film separation plates,
    each of the plurality of thin film separation plates is arranged such that holes are arranged to stagger, and
    the plurality of thin film separation plates are divided into a plurality of groups so as to be arranged.

2. The apparatus of claim 1, wherein the first gas dissolving pressure device includes:
    a liquid inlet configured, on one side, to allow the liquid discharged from the venturi tube to be injected therethrough; and
    a clogging plate configured, on the other side, and closed not to allow the liquid to pass therethrough;
    wherein the clogging plate and the liquid inlet include:
    a cylindrical first pipe formed as a pipe;
    a cylindrical second pipe configured to surround the cylindrical first pipe;
    a plurality of holes formed around the cylindrical first pipe and the cylindrical second pipe;
    a third cylindrical pipe configured to surround the cylindrical second pipe; and
    a liquid outlet connected to the cylindrical third pipe;
    wherein a plurality of holes are configured such that a diameter of an outlet side of the liquid is smaller than a diameter of an inlet side of the liquid.

3. The apparatus of claim 1, wherein the plurality of groups are four groups.

4. The apparatus of claim 1, further comprising:
    an exhaust ozone deconstruction heater for destroying the exhaust ozone separated from the water tank.

* * * * *